US012240928B2

(12) United States Patent
Saegusa et al.

(10) Patent No.: US 12,240,928 B2
(45) Date of Patent: Mar. 4, 2025

(54) POLYVINYL ALCOHOL-BASED CROSSLINKED COPOLYMER

(71) Applicant: KURARAY CO., LTD., Kurashiki (JP)

(72) Inventors: Yusuke Saegusa, Kurashiki (JP); Masahiro Baba, Kurashiki (JP); Toshinori Kato, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 780 days.

(21) Appl. No.: 17/418,132

(22) PCT Filed: Dec. 26, 2019

(86) PCT No.: PCT/JP2019/051283

§ 371 (c)(1),
(2) Date: Jun. 24, 2021

(87) PCT Pub. No.: WO2020/138356

PCT Pub. Date: Jul. 2, 2020

(65) Prior Publication Data

US 2022/0081502 A1 Mar. 17, 2022

(30) Foreign Application Priority Data

Dec. 28, 2018 (JP) ................................ 2018-248012

(51) Int. Cl.

*C08F 216/06* (2006.01)
*A01G 24/35* (2018.01)
*C08F 220/06* (2006.01)
*C08K 5/07* (2006.01)
*C08F 220/14* (2006.01)

(52) U.S. Cl.

CPC ............ *C08F 216/06* (2013.01); *A01G 24/35* (2018.02); *C08F 220/06* (2013.01); *C08K 5/07* (2013.01); *C08F 220/14* (2013.01)

(58) Field of Classification Search

None
See application file for complete search history.

(56) References Cited

U.S. PATENT DOCUMENTS 4,666,983 A 5/1987 Tsubakimoto et al.
6,286,254 B1 9/2001 Obonai et al.

FOREIGN PATENT DOCUMENTS

| | | | | |
|---|---|---|---|---|
| JP | 52-14689 | A | | 2/1977 |
| JP | 52014689 | A | * | 2/1977 |
| JP | 52-88168 | A | | 7/1977 |
| JP | 56-157434 | A | | 12/1981 |
| JP | 58-180233 | | | 10/1983 |
| JP | 63-43930 | A | | 2/1988 |
| JP | 2019-119891 | A | | 7/2019 |
| WO | WO 98/005196 | A1 | | 2/1998 |

OTHER PUBLICATIONS

International Search Report Issued Mar. 31. 2020 in PCT/JP2019/051283 (submitting English translation only), 3 pages.
International Preliminary Report on Patentability and Written Opinion Issued Jun. 16, 2021 in PCT/JP2019/051283 (submitting English translation only), 8 pages.

* cited by examiner

*Primary Examiner* — Richard A. Huhn
(74) *Attorney, Agent, or Firm* — Oblon, McClelland, Maier & Neustadt, L.L.P.

(57) ABSTRACT

A polyvinyl alcohol-based crosslinked copolymer may include an unsaturated monocarboxylic acid-based structural unit, wherein an amount of carboxylate-forming structural units in the crosslinked copolymer is 1% by mole or more and 35% by mole or less with respect to all structural units constituting the crosslinked copolymer, and a solubility of the crosslinked copolymer in water is 90% or less.

9 Claims, No Drawings

POLYVINYL ALCOHOL-BASED CROSSLINKED COPOLYMER

CROSS-REFERENCE TO RELATED APPLICATIONS

The present application is the national stage of international application PCT/JP2019/051283, filed on Dec. 26, 2019, and claims the benefit of the filing date of Japanese Appl. No. 2018-248012, filed on Dec. 28, 2018, the content of each of which is incorporated by reference.

TECHNICAL FIELD

The present invention relates to a polyvinyl alcohol-based crosslinked copolymer.

BACKGROUND ART

In recent years, with chronic depletion of water resources, the use of so-called agricultural water-retaining materials has been examined in an attempt to utilize agricultural water more effectively and appropriately or to maintain or increase the yield of agricultural products even with a smaller amount of irrigation water than before (see, for example, Patent Document 1). Such agricultural water-retaining materials, which contain a superabsorbent resin or a superabsorbent polymer (SAP) as a main constituent, exert their effects in an extremely small amount as compared to, for example, peat moss and the like used for improvement of the water retention of soil as a whole, and are thus advantageous in that their use does not impose much burden on farmers.

Patent Document 1 discloses the use of a water absorbent resin, which is mainly composed of a hydrogel of a polyacrylic acid-based polymer, as an agricultural water-retaining material. However, the hydrogel of the polyacrylic acid-based polymer is not biodegradable and thus has a problem that it is not easily eliminated from the environment.

As means for solving this problem, Patent Document 2 discloses a water absorbent resin composed of a modified polyvinyl alcohol copolymer having carboxyl groups and/or carboxylate groups, and Patent Document 3 discloses the use of a modified polyvinyl alcohol, which is obtained by saponifying and drying a maleic acid monomer-vinyl acetate copolymer, as a water-retaining material.

PRIOR ART DOCUMENTS

Patent Documents

[Patent Document 1] WO 1998/005196
[Patent Document 2] Japanese Laid-Open Patent Publication No. S63-43930
[Patent Document 3] Japanese Laid-Open Patent Publication No. S52-88168

SUMMARY OF THE INVENTION

Problems to be Solved by the Invention

However, according to the studies conducted by the present inventors, the water absorbent resin disclosed in Patent Document 2 has a problem of having a small water release amount [i.e. the amount of water that can be absorbed by a plant (the amount of water available for the growth of the plant) is small] since it has a low capacity of releasing absorbed water while having a high water absorption capacity (i.e. being able to absorb a large amount of water). Further, the water absorbent resin disclosed in Patent Document 3 has a problem in that its water absorption amount is not stable since crosslinking reactions between maleic acid-derived carboxyl groups and polyvinyl alcohol-derived hydroxy groups proceed irregularly during a drying process in its production, and this consequently causes the quality of the water absorbent resin to be unstable.

In view of the above, an object of the present invention is to provide a crosslinked copolymer which exhibits a superior stability of its quality and has a high water release capacity such that a plant can absorb a greater amount of water available for the growth.

Means for Solving Problems

The present inventors intensively studied to solve the above-described problems and consequently discovered that the problems can be solved by a specific polyvinyl alcohol-based crosslinked copolymer, thereby arriving at the present invention.

That is, the present invention encompasses the following preferred embodiments.

[1] A polyvinyl alcohol-based crosslinked copolymer, comprising an unsaturated monocarboxylic acid-based structural unit, wherein an amount of carboxylate-forming structural units in the crosslinked copolymer is 1% by mole or more and 35% by mole or less with respect to all structural units constituting the crosslinked copolymer, and a solubility of the crosslinked copolymer in water is 90% or less.

[2] The polyvinyl alcohol-based crosslinked copolymer according to [1], wherein the amount of vinyl alcohol units in the polyvinyl alcohol-based crosslinked copolymer is 20% by mole or more and 99% by mole or less with respect to all structural units constituting the crosslinked copolymer.

[3] The polyvinyl alcohol-based crosslinked copolymer according to [1] or [2], comprising a potassium ion as a counter cation of the carboxylate.

[4] The polyvinyl alcohol-based crosslinked copolymer according to any one of [1] to [3], wherein the amount of the carboxylate-forming structural units in the polyvinyl alcohol-based crosslinked copolymer is 1.5% by mole or more and 15% by mole or less with respect to all structural units constituting the crosslinked copolymer.

[5] The polyvinyl alcohol-based crosslinked copolymer according to any one of [1] to [4], wherein an amount of water that can be absorbed by a plant per 1 g of the polyvinyl alcohol-based crosslinked copolymer is 10 g or more and 100 g or less.

[6] The polyvinyl alcohol-based crosslinked copolymer according to any one of [1] to [5], comprising an acetal structure as the structure of the crosslink.

[7] The polyvinyl alcohol-based crosslinked copolymer according to [6], wherein the acetal structure is derived from at least a polyfunctional aldehyde having 2 to 20 carbon atoms.

[8] The polyvinyl alcohol-based crosslinked copolymer according to [7], wherein the polyfunctional aldehyde having 2 to 20 carbon atoms is at least one polyfunctional aldehyde selected from the group consisting of glyoxal, malonaldehyde, succinaldehyde, glutaraldehyde, adipaldehyde, malealdehyde, fumaraldehyde, tartaraldehyde, citraldehyde, terephthalaldehyde, isophthalaldehyde, phthalaldehyde, 1,9-nonanedial, and ethylenediamine tetraacetaldehyde.

[9] The polyvinyl alcohol-based crosslinked copolymer according to any one of [1] to [8], wherein the unsaturated monocarboxylic acid-based structural unit is derived from acrylic acid or a derivative thereof, or methacrylic acid or a derivative thereof.

[10] A method of producing a polyvinyl alcohol-based crosslinked copolymer, the method comprising a step of reacting a polyvinyl alcohol-based copolymer containing an unsaturated monocarboxylic acid-based structural unit with a crosslinking agent, wherein an amount of carboxylate-forming structural units in the crosslinked copolymer is 1% by mole or more and 35% by mole or less with respect to all structural units constituting the crosslinked copolymer.

[11] The method according to [10], comprising a step of, in the presence of a solvent capable of swelling the polyvinyl alcohol-based copolymer, reacting particles of the polyvinyl alcohol-based copolymer swollen with the solvent with the crosslinking agent.

[12] A water-retaining material, comprising the polyvinyl alcohol-based crosslinked copolymer according to any one of [1] to [9].

[13] The water-retaining material according to [12], which is used for agriculture.

Effects of the Invention

According to the present invention, a crosslinked copolymer, which exhibits a superior stability of its quality and has a high water release capacity such that a plant can absorb a greater amount of water available for the growth, can be provided.

Embodiments of the Invention

Embodiments of the present invention will now be described; however, the present invention is not limited to the below-described embodiments.

The polyvinyl alcohol-based crosslinked copolymer of the present invention comprises an unsaturated monocarboxylic acid-based structural unit. The amount of carboxylate-forming structural units in the crosslinked copolymer is 1% by mole or more and 35% by mole or less with respect to all structural units constituting the crosslinked copolymer, and the crosslinked copolymer has a solubility in water of 90% or less.

[Polyvinyl Alcohol-Based Crosslinked Copolymer]

The unsaturated monocarboxylic acid-based structural unit contained in the polyvinyl alcohol-based crosslinked copolymer of the present invention is derived from one or more unsaturated monocarboxylic acids or derivatives thereof. These unsaturated monocarboxylic acids or derivatives thereof are not particularly limited as long as they give the above-described specific structural unit amount and specific solubility in the present invention. Examples of the derivatives of unsaturated monocarboxylic acids include anhydrides, esterified products, and neutralized products of unsaturated monocarboxylic acids.

The crosslinked copolymer of the present invention can be used as a water absorbent resin. In order to allow a plant to absorb a greater amount of water available for the growth, the water absorbent resin is required to have a high water release capacity in addition to a high water absorption capacity. From the viewpoint of the water release capacity of the water absorbent resin, the above-described unsaturated monocarboxylic acids or derivatives thereof are preferably one or more compounds selected from the group consisting of acrylic acid, acrylic acid derivatives, methacrylic acid, and methacrylic acid derivatives. Accordingly, the unsaturated monocarboxylic acid-based structural unit contained in the crosslinked copolymer of the present invention is preferably derived from acrylic acid or a derivative thereof, or methacrylic acid or a derivative thereof. Examples of the derivative of acrylic acid include acrylic acid esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate. Examples of the derivative of methacrylic acid include methacrylic acid esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate.

The crosslinked copolymer of the present invention comprises an unsaturated monocarboxylic acid-based structural unit. In other words, the crosslinked copolymer of the present invention has a structural unit derived from an unsaturated carboxylic acid that is not polyfunctional and is monofunctional, or a derivative thereof. The carboxyl group of such a structural unit is not easily crosslinked with a hydroxy group of a vinyl alcohol unit during the production of a crosslinked copolymer; therefore, the crosslinked copolymer of the present invention can have a superior stability of its quality.

The amount of carboxylate-forming structural units in the polyvinyl alcohol-based crosslinked copolymer of the present invention is 1% by mole or more and 35% by mole or less with respect to all structural units constituting the crosslinked copolymer. When this structural unit amount is less than 1% by mole, the crosslinked copolymer can absorb only a small amount of water and thus cannot have a desired water absorption capacity. When this structural unit amount is greater than 35% by mole, the crosslinked copolymer can release its absorbed water only at a low rate and thus cannot have a desired water release capacity. The above-described structural unit amount is preferably 1.5% by mole or more, more preferably 2% by mole or more, particularly preferably 4% by mole or more, but preferably 30% by mole or less, more preferably 25% by mole or less, still more preferably less than 25% by mole, yet still more preferably 20% by mole or less, further preferably 15% by mole or less, particularly preferably 10% by mole or less. When the structural unit amount is the above-described lower limit value or more but the above-described upper limit value or less (or less than the upper limit value), the crosslinked copolymer can easily have a greater water release amount. Further, when the structural unit amount is the above-described lower limit value or more but 15% by mole or less, the crosslinked copolymer can easily have a large water absorption amount in the presence of divalent metal ions contained in a fertilizer or soil. The structural unit amount can be adjusted to be in a range of the above-described lower limit value to the above-described upper limit value by adjusting, for example, the blending ratio of vinyl acetate and an unsaturated monocarboxylic acid or a derivative thereof, the consumption rate or the reactivity ratio of these components during a reaction, the reaction temperature, or the alkali amount.

The above-described structural unit amount as well as the below-described acetalization degree and the below-described amount of vinyl alcohol units can be determined by a conventionally known method. Examples of the method include solid-state NMR (nuclear magnetic resonance spectrometry), FTIR (Fourier transform infrared spectrometry), and acid-base titration (a calculation method based on the amount of acetic anhydride consumed in a reaction of a subject with a certain amount of acetic anhydride). When the crosslinked copolymer contains an unknown structural unit, it is preferred to employ solid-state NMR as the measurement method. It is noted here that the term “structural unit” used in the present invention means a repeating unit constituting a polymer and, for example, a vinyl alcohol unit is counted as “one unit”, and a structure formed by acetalization of two vinyl alcohol units is counted as “two units”.

Examples of a counter cation of the above-described carboxylate include: alkali metal ions, such as a lithium ion, a sodium ion, a potassium ion, a rubidium ion, and a cesium ion; alkaline earth metal ions, such as a magnesium ion, a calcium ion, a strontium ion, and a barium ion; other metal ions, such as an aluminum ion and a zinc ion; onium cations, such as an ammonium ion, an imidazolium ion, a pyridinium ion, and a phosphonium ion; and a combination of two or more of these counter cations. Thereamong, a potassium ion, a calcium ion, and an ammonium ion are preferred when the crosslinked copolymer of the present invention is used as a water-retaining material for agriculture. A calcium ion is more preferred from the viewpoint of more easily maintaining the water-absorbing property upon contact with a divalent ion contained in soil, and a potassium ion is more preferred from the viewpoint of plant growth. Accordingly, in one preferred embodiment of the present invention, the crosslinked copolymer of the present invention contains a potassium ion as a counter cation of the carboxylate.

The polyvinyl alcohol-based crosslinked copolymer of the present invention has a solubility in water of 90% or less. This solubility is an index of the crosslinking degree of the crosslinked copolymer, and a solubility of higher than 90% indicates that the copolymer is not crosslinked sufficiently or at all. With the solubility being higher than 90%, the crosslinked copolymer is dissolved in water at a high rate when allowed to absorb water; therefore, its gel structure collapses and the water retaining property thus may not be ensured. However, as long as the solubility is lower than 90% by even a little (e.g., when the solubility is 87%), such collapse does not easily occur, and the crosslinked copolymer remaining without being dissolved in water has a sufficient water absorption capacity, as a result of which the crosslinked copolymer of the present invention can exert a sufficient water absorption capacity. The above-described solubility is preferably 80% or less, more preferably 70% or less. When the solubility is not higher than the upper limit value, the gel structure of the crosslinked copolymer does not easily collapse when the crosslinked copolymer absorbs water, so that the crosslinked copolymer can have a desired water absorption capacity. A higher solubility is more preferred since it can easily improve the biodegradability of the crosslinked copolymer. The solubility can be adjusted to be not higher than the above-described upper limit value by adjusting, for example, the amount of a crosslinking agent and/or that of the carboxylate. A lower limit value of the solubility is not particularly limited. The solubility is usually 5% or more. The solubility can be measured by the method described below in the section of Examples.

The form of the structure of the crosslink of the crosslinked copolymer of the present invention is not particularly limited. Examples thereof include the structures of the crosslink formed by an ester bond, an ether bond, an acetal bond, a carbon-carbon bond, or a combination of two or more of these bonds. A crosslinked structure formed by an ester bond or an acetal bond is preferred from the viewpoint of the ease of production, and a crosslinked structure formed by an acetal bond is preferred from the viewpoint of attaining higher water absorption capacity and ultraviolet resistance. Accordingly, in one preferred embodiment of the present invention, the crosslinked copolymer of the present invention has an acetal structure as the crosslinked structure.

From the viewpoint of the hydrolysis resistance of the crosslinked copolymer, the acetal structure is preferably derived from at least a polyfunctional aldehyde having 2 to 20 carbon atoms. From the viewpoint of more easily ensuring a water absorption capacity, the polyfunctional aldehyde having 2 to 20 carbon atoms is preferably at least one polyfunctional aldehyde selected from the group consisting of glyoxal, malonaldehyde, succinaldehyde, glutaraldehyde, adipaldehyde, malealdehyde, fumaraldehyde, tartaraldehyde, citraldehyde, terephthalaldehyde, isophthalaldehyde, phthalaldehyde, 1,9-nonanedial, and ethylenediamine tetraacetaldehyde.

The acetalization degree of the polyvinyl alcohol-based crosslinked copolymer of the present invention is preferably 0.01% by mole to 50% by mole. When the acetalization degree is in this range, the water absorption capacity of the polyvinyl alcohol-based crosslinked copolymer can be more easily improved. From this viewpoint, the acetalization degree is preferably 0.02% by mole or more, more preferably 0.05% by mole or more, still more preferably 0.1% by mole or more, but preferably 40% by mole or less, more preferably 30% by mole or less, still more preferably 20% by mole or less. The acetalization degree can be adjusted by adjusting the amount of an acetalization agent used in a crosslinking reaction. The acetalization degree means a ratio of the amount of acetalized vinyl alcohol units after an acetalization reaction with respect to the amount of vinyl alcohol units prior to the acetalization reaction in the polyvinyl alcohol-based crosslinked copolymer.

The amount of vinyl alcohol units in the polyvinyl alcohol-based crosslinked copolymer of the present invention is preferably 20% by mole or more, more preferably 30% by mole or more, still more preferably 40% by mole or more, yet still more preferably 50% by mole or more, yet still more preferably 65% by mole or more, yet still more preferably 70% by mole or more, yet still more preferably 75% by mole or more, yet still more preferably greater than 75% by mole, yet still more preferably 80% by mole or more, further preferably 85% by mole or more, particularly preferably 90% by mole or more, but preferably 99% by mole or less, more preferably 98.5% by mole or less, still more preferably 98% by mole or less, particularly preferably 96% by mole or less, with respect to all structural units constituting the crosslinked copolymer. When the amount of vinyl alcohol units is the above-described lower limit value or more (or more than the lower limit value) but the above-described upper limit value or less, the crosslinked copolymer can easily have a higher water absorption capacity. The amount of vinyl alcohol units can be adjusted to be in a range of the above-described lower limit value to the above-described upper limit value by adjusting, for example, the blending ratio of vinyl acetate and an unsaturated monocarboxylic acid or a derivative thereof, the consumption rate or the reactivity ratio of these components during a reaction, or the reaction temperature.

The polyvinyl alcohol-based crosslinked copolymer of the present invention may also contain a structural unit other than the unsaturated monocarboxylic acid-based structural unit and vinyl alcohol unit. Examples of such other structural unit include: structural units derived from a vinyl carboxylate, such as vinyl acetate or vinyl pivalate; structural units derived from an olefin, such as ethylene, 1-butene, or isobutylene; structural units derived from acrylamide or a derivative thereof, methacrylamide or a derivative thereof, or a maleimide derivative; and structural units derived from a polyfunctional unsaturated carboxylic acid or a derivative thereof, such as maleic anhydride. When the crosslinked copolymer of the present invention contains other structural unit as described above, the crosslinked copolymer of the present invention may contain one or more of the above-exemplified other structural units. The content of the other structural unit(s) is preferably 50% by mole or less, more preferably 30% by mole or less, still more preferably 15% by mole or less, and may be 0% by mole, with respect to all structural units constituting the crosslinked copolymer of the present invention. When the content of the other structural unit(s) is not more than this upper limit value, the crosslinked copolymer of the present invention can more easily have a superior water absorption capacity.

Particularly, the content of a structural unit derived from a polyfunctional unsaturated carboxylic acid or a derivative thereof is preferably 10% by mole or less, more preferably 5% by mole or less, still more preferably 1% by mole or less, yet still more preferably 0% by mole. This is because, when the content of carboxyl groups of such a structural unit is large, crosslinking reactions between the carboxyl groups and the hydroxy groups of vinyl alcohol units more easily occur during the production of the crosslinked copolymer, as a result of which the quality stability may be deteriorated.

The viscosity-average polymerization degree of the crosslinked copolymer of the present invention is not particularly limited. From the viewpoint of the ease of production, the viscosity-average polymerization degree is preferably 20,000 or less, more preferably 10,000 or less, still more preferably 4,000 or less, particularly preferably 3,000 or less. Meanwhile, from the viewpoint of the mechanical properties and the solubility in water of the crosslinked copolymer, the viscosity-average polymerization degree is preferably 100 or more, more preferably 200 or more, still more preferably 400 or more. The viscosity-average polymerization degree can be adjusted to be in a range of the above-described lower limit value to the above-described upper limit value by adjusting, for example, the polymerization conditions. The viscosity-average polymerization degree of the crosslinked copolymer of the present invention can be measured by, for example, a method according to JIS K6726.

The crosslinked copolymer of the present invention is preferably in the form of particles. When the crosslinked copolymer of the present invention is in the form of particles, the average particle diameter thereof is preferably 10 μm or more, more preferably 50 μm or more, particularly preferably 80 pin or more, but preferably 1,000 μm or less, more preferably 500 μm or less, particularly preferably 300 μm or less. When the average particle diameter is the above-described lower limit value or more, excellent ease of handling is more easily obtained, while when the average particle diameter is the above-described upper limit value or less, an excellent water absorption rate is more easily obtained. The average particle diameter can be adjusted to be in a range of the above-described lower limit value to the above-described upper limit value by adjusting, for example, the saponification conditions and/or the pulverization conditions. The average particle diameter can be measured by a laser diffraction/scattering method.

[Method of Producing Polyvinyl Alcohol-Based Crosslinked Copolymer]

The present invention also relates to a method of producing a polyvinyl alcohol-based crosslinked copolymer, the method comprising the step of reacting a polyvinyl alcohol-based copolymer containing an unsaturated monocarboxylic acid-based structural unit with a crosslinking agent, wherein the amount of carboxylate-forming structural units in the crosslinked copolymer is 1% by mole or more and 35% by mole or less with respect to all structural units constituting the crosslinked copolymer.

In this production method, the polyvinyl alcohol-based copolymer containing an unsaturated monocarboxylic acid-based structural unit can be prepared by, for example, (i) a method of polymerizing at least one compound selected from the group consisting of unsaturated monocarboxylic acids and derivatives thereof with a vinyl ester in the presence of a known polymerization initiator by a known method, and subsequently saponifying the thus obtained polymer by a known method; or (ii) a method of polymerizing a polyvinyl alcohol-based polymer with at least one compound selected from the group consisting of unsaturated monocarboxylic acids and derivatives thereof in the presence of a known polymerization initiator by a known method, and subsequently saponifying the thus obtained polymer by a known method.

As described in the section of [Polyvinyl Alcohol-Based Crosslinked Copolymer], the unsaturated monocarboxylic acids and derivatives thereof in the above-described (i) and (ii) are not particularly limited. From the viewpoint of the ease of obtaining a crosslinked copolymer having a desired water absorption capacity, the unsaturated monocarboxylic acids and derivatives thereof are preferably one or more compounds selected from the group consisting of acrylic acid, acrylic acid derivatives, methacrylic acid, and methacrylic acid derivatives.

The vinyl ester used in the above-described (i) is not particularly limited. Examples thereof include vinyl acetate, vinyl propionate, vinyl butyrate, vinyl valerate, vinyl stearate, vinyl benzoate, vinyl trifluoroacetate, and vinyl pivalate. From the viewpoint of industrial availability, the vinyl ester is preferably vinyl acetate.

The polyvinyl alcohol-based polymer used in the above-described (ii) is not particularly limited. The polyvinyl alcohol-based polymer may be a polyvinyl alcohol containing only vinyl alcohol units, or a polymer containing other structural unit in addition to a vinyl alcohol unit. The polyvinyl alcohol-based polymer may be, for example, an ethylene-vinyl alcohol copolymer.

In the case of producing a polyvinyl alcohol-based crosslinked copolymer which contains other structural unit in addition to an unsaturated monocarboxylic acid-based structural unit and a vinyl alcohol unit, a compound giving the other structural unit can be further added in the polymerization step of the above-described (i). As this compound, any of those compounds giving the other structural unit that are exemplified in the section of [Polyvinyl Alcohol-Based Crosslinked Copolymer] can be used.

The saponification degree of the polyvinyl alcohol-based copolymer is not particularly limited. The water absorption capacity of the polyvinyl alcohol-based crosslinked copolymer of the present invention is greatly affected by the amount of carboxylate-forming structural units as well as the amount of crosslinked structures in the crosslinked copolymer, while the effect of the saponification degree on the water absorption capacity is extremely small. Therefore, the saponification degree may be, for example, 30% by mole or more, 60% by mole or more (e.g., 70% by mole or more), or 99% by mole or more (e.g., 100% by mole).

The reaction between the polyvinyl alcohol-based copolymer and the crosslinking agent may be performed by any known method. The crosslinking agent is not particularly limited, and a crosslinking agent that gives the crosslinked structures exemplified in the section of [Polyvinyl Alcohol-Based Crosslinked Copolymer] can be used. From the viewpoint of more easily obtaining a desired water absorption capacity, the crosslinking agent may be used in such an amount that the amount of the crosslinked structures in the polyvinyl alcohol-based crosslinked copolymer is preferably 0.005% by mole or more, more preferably 0.01% by mole or more, still more preferably 0.05% by mole or more, particularly preferably 0.1% by mole or more, but preferably 0.5% by mole or less, more preferably 0.4% by mole or less, particularly preferably 0.35% by mole or less. The amount of crosslinked structures means the amount of structural units constituting the crosslinked structures with respect to all structural units constituting the polyvinyl alcohol-based crosslinked copolymer.

In one preferred embodiment, the above-described production method of the present invention comprises the step of, in the presence of a solvent capable of swelling the above-described polyvinyl alcohol-based copolymer, reacting particles of the polyvinyl alcohol-based copolymer swollen with the solvent with the crosslinking agent.

In the present invention, the "solvent capable of swelling the polyvinyl alcohol-based copolymer" is not particularly limited as long as it is capable of swelling polyvinyl alcohol-based polymer particles used as a raw material and does not dissolve the polyvinyl alcohol-based polymer particles at a reaction temperature. Examples of such a solvent include organic solvents and water, for example, dialkyl ketones, such as acetone and 2-butanone; nitriles, such as acetonitrile; alcohols, such as methanol, ethanol, 1-propanol, 2-propanol, 1-butanol, 2-butanol, amyl alcohol, isoamyl alcohol, hexanol, cyclohexanol, octanol, and tert-butanol; ethers, such as 1,4-dioxane, tetrahydrofuran, 1,2-dimethoxyethane, and diglyme; diol compounds, such as ethylene glycol and triethylene glycol; carboxylic acid amides, such as acetamide, NA-dimethylformamide, N,N-dimethylacetamide, and N-methylpyrrolidone; dimethyl sulfoxide; and phenol. Thereamong, taking into consideration the ease of removing the solvent from a modified polyvinyl alcohol resin obtained after a heterogeneous reaction, the solubility of a carbonyl compound and an acid catalyst in the solvent, and the industrial availability of the solvent, the solvent is preferably at least one selected from the group consisting of dialkyl ketones, nitriles, alcohols, ethers, and water, more preferably at least one selected from the group consisting of acetone, 2-butanone, acetonitrile, methanol, ethanol, 1-propanol, 2-propanol, tert-butanol, 1,4-dioxane, tetrahydrofuran, and water, still more preferably at least one selected from the group consisting of acetone, 2-butanone, acetonitrile, methanol, 2-propanol, 1,4-dioxane, tetrahydrofuran, and water. These organic solvents may be used singly, or in combination of two or more thereof as a mixture.

In the production method of the present invention, in the presence of the above-described solvent capable of swelling the polyvinyl alcohol-based copolymer, particles of the polyvinyl alcohol-based copolymer swollen with the solvent are reacted with the crosslinking agent; therefore, particles of the resulting polyvinyl alcohol-based crosslinked copolymer can be easily recovered without requiring a precipitation process.

The average particle diameter of the particles of the polyvinyl alcohol-based copolymer prior to the swelling is preferably 10 μm or more, more preferably 50 μm or more, particularly preferably 80 μm or more, but preferably 1,000 μm or less, more preferably 500 μm or less, particularly preferably 300 μm or less. When this average particle diameter is the above-described lower limit value or more, excellent ease of handling can be more easily obtained, while when the average particle diameter is the above-described upper limit value or less, an excellent water absorption rate can be more easily obtained. The average particle diameter can be adjusted to be in a range of the above-described lower limit value to the above-described upper limit value by adjusting, for example, the saponification conditions and/or the pulverization conditions. The average particle diameter can be measured by a laser diffraction/scattering method.

The polyvinyl alcohol-based crosslinked copolymer of the present invention contains a carboxylate-forming structural unit. Examples of a method of producing a polyvinyl alcohol-based crosslinked copolymer into which a carboxylate-forming structural unit is introduced include: the above-described methods (i) and (ii) in which a neutralized product of an unsaturated monocarboxylic acid is used; and a method of neutralizing a crosslinked copolymer obtained after the above-described reaction with the crosslinking agent.

The amount of the carboxylate-forming structural units in the polyvinyl alcohol-based crosslinked copolymer produced by the production method of the present invention is 1% by mole or more and 35% by mole or less with respect to all structural units constituting the crosslinked copolymer.

With regard to the details, preferred embodiments and the like of the polyvinyl alcohol-based crosslinked copolymer produced by the production method of the present invention, the same descriptions in the section of [Polyvinyl Alcohol-Based Crosslinked Copolymer] can be applied.

The amount of water that the polyvinyl alcohol-based crosslinked copolymer of the present invention can absorb ($W_1$ [g/g]) and the ratio of water that can be absorbed by a plant ($W_2$ [%]) are adjustable based on the amount of crosslinked structures and that of carboxylate-forming structural units in the crosslinked copolymer. The $W_1$ can be increased by reducing the amount of crosslinked structures or increasing the amount of carboxylate-forming structural units in the polyvinyl alcohol-based crosslinked copolymer, and the $W_2$ can be increased by increasing the amount of crosslinked structures or reducing the amount of carboxylate-forming structural units in the crosslinked copolymer. The amount of water that can be absorbed by a plant per 1 g of the crosslinked copolymer ($W_3$ [g/g]) is represented by $W_3=W_1 \times W_2/100$, and the value thereof is preferably 10 or more, more preferably 20 or more, still more preferably 30 or more, most preferably 45 or more. Further, the amount of water that can be absorbed by a plant per 1 g of the crosslinked copolymer is usually 100 g/g or less, preferably 80 g/g or less, more preferably 60 g/g or less. The $W_1$, $W_2$, and $W_3$ can be determined by the method described below in the section of Examples.

The standard deviation of the pure water absorption amount $W_1$ per 1 g of the crosslinked copolymer is preferably 0 or more and 30 or less, more preferably 20 or less, still more preferably 15 or less. The standard deviation can be adjusted based on the types of the monomers constituting the crosslinked copolymer, and a standard deviation in this range can represent that the crosslinked copolymer has a high stability of its quality in terms of $W_1$.

The present invention also relates to a water-retaining material comprising the polyvinyl alcohol-based crosslinked copolymer of the present invention. The present invention further relates to the above-described water-retaining material which is used for agriculture.

In the water-retaining material, the polyvinyl alcohol-based crosslinked copolymer of the present invention may be contained singly, or two or more thereof may be contained as a mixture.

The water-retaining material may further contain an additive(s) as an optional component(s). Examples of the additives include: polysaccharides, such as starch, modified starch, sodium alginate, chitin, chitosan, cellulose, and derivatives thereof; resins, such as polyethylene, polypropylene, an ethylene-propylene copolymer, polystyrene, an acrylonitrile-styrene copolymer, an acrylonitrile-butadiene-styrene copolymer, polyvinyl chloride, a polycarbonate resin, polyethylene terephthalate, polybutylene terephthalate, polylactic acid, polysuccinic acid, polyamide 6, polyamide 6-6, polyamide 6-10, polyamide 11, polyamide 12, polyamide 6-12, polyhexamethylene diamine terephthalamide, polyhexamethylene diamine isophthalamide, polynonamethylene diamine terephthalamide, a polyphenylene ether, polyoxymethylene, polyethylene glycol, polypropylene glycol, polytrimethylene glycol, polytetramethylene glycol, polyurethane, polyvinyl alcohol, an ethylene-vinyl alcohol copolymer, polyvinyl acetate, an ethylene-vinyl acetate copolymer, polyacrylic acid, a polyacrylic acid ester, polyacrylate, polymethacrylic acid, an polymethacrylic acid ester, polymethacrylate, an ethylene-acrylic acid copolymer, an ethylene-acrylic acid ester copolymer, an ethylene-acrylate copolymer, an ethylene-methacrylic acid copolymer, an ethylene-methacrylic acid ester copolymer, and an ethylene-methacrylate copolymer; rubbers and elastomers, such as a natural rubber, a synthetic isoprene rubber, a chloroprene rubber, a silicone rubber, a fluororubber, an urethane rubber, an acrylic rubber, a styrene-based thermoplastic elastomer, an olefin-based thermoplastic elastomer, an ester-based thermoplastic elastomer, an urethane-based thermoplastic elastomer, and an amide-based thermoplastic elastomer; an ultraviolet absorber; an antioxidant; a light stabilizer; a plasticizer; an organic solvent; an antifoaming agent; a thickener; a surfactant; a lubricant; a fungicide; and an antistatic agent. The additive(s) may be used singly, or in combination of two or more thereof. When the water-retaining material contains the additive(s), a total mass thereof may be any value within a range that does not impair the effects of the present invention, and it is usually 30% by mass or less, preferably 20% by mass or less, with respect to a total mass of the water retention material.

The polyvinyl alcohol-based crosslinked copolymer of the present invention exhibits high water absorption and excellent quality stability and, therefore, can also be used in the applications of a generally known water absorbent resin in addition to the use as a water-retaining material. Examples of the applications include: absorbents in hygiene products, such as baby diapers, infant diapers, child diapers, adult diapers, sanitary products, and protective underwears; water infiltration-inhibiting materials in underground powder cables and communication cables; carriers in drug delivery systems; absorbents of leaked and discharged aqueous liquids; absorbent coatings for paints, inks, and colorant compositions; carriers for controlled release of insecticides, herbicides, aromatics, and drugs; flame-retardant gels; funeral pads; surgical pads; wound dressing materials; medical waste solidifying materials; absorbent pads and packaging materials for food products; cosmetic gelling agents; sealing composite materials; filtration applications; fuel monitoring systems for airplanes and automobiles; water suppliers for cage-reared animals; stationary waterbeds; toys expandable in water; drilling fluid additives; artificial snow; and polymer sand.

EXAMPLES

The present invention will now be described in more detail by way of Examples thereof; however, the present invention is not limited by the following Examples at any rate.

[Measured Items and Measurement Methods]

(1) Amount of Carboxylate-Forming Structural Units and Amount of Vinyl Alcohol Units For each water absorbent resin (polyvinyl alcohol-based crosslinked copolymer) produced in Examples and Comparative Examples, IR measurement was performed using an infrared spectrometer "NICOLET iS10" manufactured by Thermo Fisher Scientific K.K. In the thus obtained IR spectrum, the area of peaks (2,990 to 2,560 $cm^{-1}$) based on methylene groups and methine groups of vinyl alcohol units and carboxylic acid-based structural units, and the area of peaks (1,625 to 1,510 $cm^{-1}$) based on carboxylate groups of carboxylate-forming structural units were determined.

Subsequently, for each water absorbent resin produced in Examples and Comparative Examples, the amount (unit: % by mole) of carboxylate-forming structural units and the amount (unit: % by mole) of vinyl alcohol units in the crosslinked copolymer were calculated based on the following equations.

Amount of carboxylate(acrylate)-forming structural units=13.07×(Area of peaks based on carboxylate groups)/(Area of peaks based on methylene groups and methine groups)

Amount of carboxylate(maleate)-forming structural units=13.07×{(Area of peaks based on carboxylate groups)/(Area of peaks based on methylene groups and methine groups)}/2

Amount of vinyl alcohol units=100−(Amount of carboxylate-forming structural units+Amount of crosslinked structures)

In the above equations, "13.07" is a coefficient for calculating the amount of carboxylate-forming structural units using the respective equations with regard to each water absorbent resin produced in Examples and Comparative Examples. This coefficient was determined from a calibration curve prepared in advance.

(2) Solubility in Water

To 100 mL of 25° C. pure water, 0.1 g of each crosslinked copolymer produced in Examples and Comparative Examples was added, and the resulting mixture was left to stand for 6 hours. Thereafter, this mixture was naturally filtered through a TETORON mesh (280-mesh), the thus recovered gel was vacuum-dried at 40° C. for 12 hours, and the solubility S in water (unit: %) of the crosslinked copolymer was calculated based on the following equation:

$S$=(Sample mass after drying/Sample mass before absorption of pure water)×100

(3) Amount of Water that can be Absorbed by Plant

First, in accordance with JIS K7223, the pure water absorption amount of each crosslinked copolymer produced in Examples and Comparative Examples was measured (number of samples: n=3), and the average value and the standard deviation of the pure water absorption amount $W_1$ (unit: g/g) per 1 g of each crosslinked copolymer were calculated based on the following equation:

$$W_1=[(\text{Sample mass after absorption of pure water})-(\text{Sample mass before absorption of pure water})]/(\text{Sample mass before absorption of pure water})$$

In the present invention, the "ratio of water that can be absorbed by a plant" [$W_2$ (unit: %)] means a ratio of water that can be absorbed by a plant with respect to the saturated water absorption amount of the crosslinked copolymer. This ratio $W_2$ can be simply determined by a centrifugation method. In the present invention, the ratio $W_2$ was determined by the following method.

A crosslinked copolymer was allowed to absorb 50 times by mass of water with respect to the mass of the crosslinked copolymer, and therefrom 2.4 g of the crosslinked copolymer was taken out and introduced to a syringe as a sample. This syringe was immobilized in a centrifuge tube at a position of 10.2 cm from the center of a small-sized centrifuge "H-36" manufactured by KOKUSAN Co., Ltd. The centrifuge was operated at 2,200 rpm for 60 minutes, and the ratio $W_2$ of water that can be absorbed by a plant and the ratio $W_3$ (unit: g/g) of water that can be absorbed by a plant per 1 g of the crosslinked copolymer were calculated based on the following equations. It is noted here that, when the crosslinked copolymer was not able to absorb 50 times by mass of water, the resin was allowed to absorb water to saturation, and therefrom 2.4 g of the resin was taken out and introduced to the syringe.

$$W_2=[\{(\text{Sample mass before centrifugation})-(\text{Sample mass after centrifugation})\}/\text{Sample mass before centrifugation}]\times 100$$

$$W_3=W_1\times W_2/100$$

(4) $CaCl_2$ Solution Absorption Amount $W_4$ Per 1 g of Crosslinked Copolymer

In accordance with the sample setting method of JIS K7223, each crosslinked copolymer produced in Examples and Comparative Examples was immersed in a 1.44 g/L calcium chloride solution for 6 hours. The crosslinked copolymer thus allowed to absorb the calcium chloride solution and the calcium chloride solution that was not absorbed by the crosslinked copolymer were separated using a TETRON 280-mesh, and the $CaCl_2$ solution absorption amount $W_4$ (unit: g/g) per 1 g of the crosslinked copolymer was calculated using the following equation:

$$W_4=[(\text{Sample mass after absorption of calcium chloride solution})-(\text{Sample mass before absorption of calcium chloride solution})]/(\text{Sample mass before absorption of calcium chloride solution})$$

(4) Average Particle Diameter

Using a laser diffraction/scattering-type particle diameter distribution analyzer (LA-950V2, manufactured by HORIBA, Ltd.), the average particle diameter was measured for each of the polyvinyl alcohol-based copolymers produced in Preparation Examples and the crosslinked copolymers produced in Examples and Comparative Examples.

Preparation Example 1: Preparation of Polyvinyl Alcohol-Based Copolymer Containing Unsaturated Monocarboxylic Acid-Based Structural Unit (Methyl Acrylate-Derived Structural Unit To a reactor equipped with a stirrer, a reflux condenser, a nitrogen introduction tube and an initiator addition port, 602 g of vinyl acetate (VAc), 1.21 g of methyl acrylate (MA), and 255 g of methanol were introduced, and the reactor was purged with an inert gas for 30 minutes under nitrogen bubbling. The temperature inside the reactor was increased by heating in a water bath and, once the temperature reached 60° C., 0.16 g of azobisisobutyronitrile (AIBN) was added as an initiator to start polymerization. Sampling was performed as appropriate to confirm the progress of the polymerization based on the solid concentration, and the consumption rate (Conv.), which is a ratio of a total mass of vinyl acetate and methyl acrylate that were consumed by the polymerization with respect to a total mass of vinyl acetate and methyl acrylate that were introduced, was determined. Once the consumption rate reached 4%, the polymerization was terminated by cooling the inside of the reactor to 30° C. The reactor was connected to a vacuum line, and the residual vinyl acetate was removed by vacuum distillation at 30° C. along with methanol. While visually checking the inside of the reactor, the distillation was continued with an addition of methanol as appropriate in response to an increase in the viscosity, whereby a polyvinyl acetate containing 5.2% by mole of a methyl acrylate-derived structural unit (PVAc-PMA) was obtained. It is noted here that the amount of the methyl acrylate-derived structural unit (MA modification amount) was determined by solid-state NMR.

Next, 1 g of the thus obtained PVAc-PMA and 18.2 g of methanol were introduced to the same reactor as described above, and the PVAc-PMA was dissolved in methanol. By heating in a water bath, the content in the reactor was heated with stirring until the temperature inside the reactor reached 70° C. Subsequently, 0.78 g of a methanol solution of sodium hydroxide (concentration: 15% by mass) was added to perform saponification at 70° C. for 2 hours. The resulting solution was filtered to obtain a polyvinyl alcohol-based copolymer containing 5.2% by mole of a methyl acrylate-derived structural unit. The thus obtained polyvinyl alcohol-based copolymer was in the form of particles.

Preparation Examples 2 to 7: Preparation of Polyvinyl Alcohol-Based Copolymers Containing Unsaturated Monocarboxylic Acid-Based Structural Unit Polyvinyl alcohol-based copolymers containing a methyl acrylate-derived structural unit were obtained in the same manner as in Preparation Example 1, except the amount of each component, the consumption rate, and the MA modification amount were changed from those of Preparation Examples 1 as shown in Table 1. All of the thus obtained polyvinyl alcohol-based copolymers were in the form of particles.

Preparation Example 8: Preparation of Polyvinyl Alcohol-Based Copolymer Containing Unsaturated Dicarboxylic Acid-Based Structural Unit (Dimethyl Maleate-Derived Structural Unit A polyvinyl acetate containing a dimethyl maleate-derived structural unit (PVAc-PMM) was obtained by performing polymerization in the same manner as in Preparation Example 1, except that dimethyl maleate (MM) was used in place of methyl acrylate (MA). Subsequently, a polyvinyl alcohol-based copolymer containing a dimethyl maleate-derived structural unit was obtained in the same manner as in Preparation Example 1, except that the PVAc-PMM was used in place of the PVAc-PMA. The amount of each component, the consumption rate, and the MM modification amount were as shown in Table 1. The thus obtained polyvinyl alcohol-based copolymer was in the form of particles.

TABLE 1

| | Polymerization step | | | | | | Saponification step | | | Average particle |
|---|---|---|---|---|---|---|---|---|---|---|
| Preparation Example | VAc [g] | MA or MM [g] | methanol [g] | AIBN [g] | Consumption rate Conv. [%] | MA or MM modification amount [% by mole] | PVAc-PMA or PVAc-PMM [g] | Methanol [g] | Methanol solution of NaOH [g] | diameter of polyvinyl alcohol-based copolymer [μm] |
| 1 | 602 | 1.21 | 255 | 0.16 | 4 | 5.2 | 1 | 18.2 | 0.78 | 125 |
| 2 | 602 | 0.30 | 254 | 0.16 | 2 | 2.0 | 1 | 18.3 | 0.68 | 128 |
| 3 | 602 | 3.01 | 255 | 0.16 | 4 | 14.8 | 1 | 17.9 | 1.08 | 112 |
| 4 | 602 | 7.53 | 257 | 0.16 | 6 | 20.2 | 1 | 17.8 | 1.25 | 135 |
| 5 | 602 | 15.07 | 260 | 0.16 | 8 | 29.7 | 1 | 17.5 | 0.54 | 142 |
| 6 | 602 | 0.12 | 254 | 0.16 | 4 | 0.5 | 1 | 18.4 | 0.64 | 115 |
| 7 | 602 | 30.13 | 267 | 0.17 | 12 | 40.0 | 1 | 17.1 | 1.86 | 128 |
| 8 | 602 | 0.14 | 262 | 0.17 | 4 | 15.2 | 1 | 17.6 | 0.50 | 132 |

Example 1

To a three-necked separable flask equipped with a reflux condenser and a stirring blade, 58.9 g of acetonitrile, 6.28 g of ion-exchanged water, 0.171 g of a 25%-by-mass aqueous glutaraldehyde solution, and 20 g of the polyvinyl alcohol-based copolymer obtained in Preparation Example 1 were introduced, and the polyvinyl alcohol-based copolymer was dispersed by stirring at 23° C. Subsequently, 12.38 g of a 16.9%-by-mass aqueous sulfuric acid solution was added dropwise over a period of 15 minutes, and the resulting mixture was heated to 65° C. and allowed to react for 6 hours. The polyvinyl alcohol-based copolymer obtained after the reaction was recovered by filtration, and washed with 160 g of methanol six times. Thereafter, the washed copolymer was introduced to a three-necked separable flask equipped with a reflux condenser and a stirring blade, and 71 g of methanol, 13.3 g of ion-exchanged water and 5.7 g of potassium hydroxide were added and allowed to react at 65° C. for 2 hours. The copolymer obtained after the reaction was recovered by filtration, washed with 160 g of methanol six times, and then vacuum-dried at 40° C. for 12 hours, whereby a polyvinyl alcohol-based crosslinked copolymer containing a desired acrylic acid-based structural unit was obtained. The above-described measurements (1) to (3) were performed for the thus obtained crosslinked copolymer. The results thereof are shown in Table 2.

Example 2

A polyvinyl alcohol-based crosslinked copolymer containing a desired acrylic acid-based structural unit was produced and measured in the same manner as in Example 1, except that the added amount of the 25%-by-mass aqueous glutaraldehyde solution was changed from 0.171 g to 0.341 g. The results thereof are shown in Table 2.

Example 3

A polyvinyl alcohol-based crosslinked copolymer containing a desired acrylic acid-based structural unit was produced and measured in the same manner as in Example 1, except that the added amount of the 25%-by-mass aqueous glutaraldehyde solution was changed from 0.171 g to 0.512 g. The results thereof are shown in Table 2.

Example 4

A polyvinyl alcohol-based crosslinked copolymer containing a desired acrylic acid-based structural unit was produced and measured in the same manner as in Example 1, except that the polyvinyl alcohol-based copolymer obtained in Preparation Example 2 was used in place of the polyvinyl alcohol-based copolymer obtained in Preparation Example 1, 12.42 g of a 17.2%-by-mass aqueous sulfuric acid solution was used in place of 12.38 g of the 16.9%-by-mass aqueous sulfuric acid solution, and the added amount of the 25%-by-mass aqueous glutaraldehyde solution and that of potassium hydroxide were changed from 0.171 g and 5.7 g to 0.174 g and 2.4 g, respectively. The results thereof are shown in Table 2.

Example 5

A polyvinyl alcohol-based crosslinked copolymer containing a desired acrylic acid-based structural unit was produced and measured in the same manner as in Example 1, except that the polyvinyl alcohol-based copolymer obtained in Preparation Example 3 was used in place of the polyvinyl alcohol-based copolymer obtained in Preparation Example 1, 11.92 g of a 13.5%-by-mass aqueous sulfuric acid solution was used in place of 12.38 g of the 16.9%-by-mass aqueous sulfuric acid solution, and the added amount of the 25%-by-mass aqueous glutaraldehyde solution and that of potassium hydroxide were changed from 0.171 g and 5.7 g to 0.131 g and 15 g, respectively. The results thereof are shown in Table 2.

Example 6

A polyvinyl alcohol-based crosslinked copolymer containing a desired acrylic acid-based structural unit was produced and measured in the same manner as in Example 1, except that the polyvinyl alcohol-based copolymer obtained in Preparation Example 4 was used in place of the polyvinyl alcohol-based copolymer obtained in Preparation Example 1, 11.67 g of a 12.1%-by-mass aqueous sulfuric acid solution was used in place of 12.38 g of the 16.9%-by-mass aqueous sulfuric acid solution, and the added amount of the 25%-by-mass aqueous glutaraldehyde solution and that of potassium hydroxide were changed from 0.171 g and 5.7 g to 0.31 g and 24 g, respectively. The results thereof are shown in Table 2.

Example 7

A polyvinyl alcohol-based crosslinked copolymer containing a desired acrylic acid-based structural unit was produced and measured in the same manner as in Example 1, except that the polyvinyl alcohol-based copolymer obtained in Preparation Example 5 was used in place of the polyvinyl alcohol-based copolymer obtained in Preparation Example 1, 11.35 g of a 10.0%-by-mass aqueous sulfuric acid solution was used in place of 12.38 g of the 16.9%-by-mass aqueous sulfuric acid solution, and the added amount of the 25%-by-mass aqueous glutaraldehyde solution and that of potassium hydroxide were changed from 0.171 g and 5.7 g to 0.375 g and 26.2 g, respectively. The results thereof are shown in Table 2.

Comparative Example 1

A polyvinyl alcohol-based crosslinked copolymer containing an acrylic acid-based structural unit was produced and measured in the same manner as in Example 1, except that the polyvinyl alcohol-based copolymer obtained in Preparation Example 6 was used in place of the polyvinyl alcohol-based copolymer obtained in Preparation Example 1, 12.48 g of a 17.7%-by-mass aqueous sulfuric acid solution was used in place of 12.38 g of the 16.9%-by-mass aqueous sulfuric acid solution, and the added amount of the 25%-by-mass aqueous glutaraldehyde solution and that of potassium hydroxide were changed from 0.171 g and 5.7 g to 0.18 g and 0.6 g, respectively. The results thereof are shown in Table 2.

Comparative Example 2

A polyvinyl alcohol-based crosslinked copolymer containing an acrylic acid-based structural unit was produced and measured in the same manner as in Example 1, except that the polyvinyl alcohol-based copolymer obtained in Preparation Example 7 was used in place of the polyvinyl alcohol-based copolymer obtained in Preparation Example 1, 11.15 g of a 8.0%-by-mass aqueous sulfuric acid solution was used in place of 12.38 g of the 16.9%-by-mass aqueous sulfuric acid solution, and the added amount of the 25%-by-mass aqueous glutaraldehyde solution and that of potassium hydroxide were changed from 0.171 g and 5.7 g to 0.37 g and 32.2 g, respectively. The results thereof are shown in Table 2.

Comparative Example 3

A polyvinyl alcohol-based crosslinked copolymer containing a maleic acid-based structural unit was produced and measured in the same manner as in Example 1, except that the polyvinyl alcohol-based copolymer obtained in Preparation Example 8 was used in place of the polyvinyl alcohol-based copolymer obtained in Preparation Example 1, 10.96 g of a 5.3%-by-mass aqueous sulfuric acid solution was used in place of 12.38 g of the 16.9%-by-mass aqueous sulfuric acid solution, the amount of the 25%-by-mass aqueous glutaraldehyde solution was changed from 0.171 g to 0.343 g, and the amount of potassium hydroxide was changed from 5.7 g to 14.2 g. The results thereof are shown in Table 2.

TABLE 2

| | Amount of crosslinked structures [% by mole] | Amount of carboxylate-forming structural units [% by mole] | Amount of vinyl alcohol units [% by mole] | Solubility in water S [%] | Pure water absorption amount $W_1$ per 1 g of crosslinked copolymer [g/g] | Standard deviation of pure water absorption amount $W_1$ per 1 g of crosslinked copolymer |
|---|---|---|---|---|---|---|
| Example 1 | 0.1 | 5.2 | 94.7 | 45 | 199 | 10 |
| Example 2 | 0.2 | 5.2 | 94.6 | 13 | 94 | 3 |
| Example 3 | 0.3 | 5.2 | 94.5 | 9 | 43 | 2 |
| Example 4 | 0.1 | 2.0 | 97.9 | 40 | 73 | 2 |
| Example 5 | 0.1 | 14.8 | 85.1 | 61 | 221 | 12 |
| Example 6 | 0.3 | 20.2 | 79.5 | 32 | 140 | 11 |
| Example 7 | 0.3 | 29.7 | 70.0 | 48 | 264 | 12 |
| Comparative Example 1 | 0.1 | 0.5 | 99.4 | 38 | 9 | 2 |
| Comparative Example 2 | 0.3 | 40.0 | 59.7 | 64 | 294 | 13 |
| Comparative Example 3 | 0.3 | 15.2 | 67.7 | 52 | 272 | 32 |

| | Ratio $W_2$ of water that can be absorbed by plant [%] | Amount $W_3$ of water that can be absorbed by plant per 1 g of crosslinked copolymer [g/g] | $CaCl_2$ solution absorption amount $W_4$ per 1 g of crosslinked copolymer [g/g] | Average particle diameter of polyvinyl alcohol-based crosslinked copolymer [μm] |
|---|---|---|---|---|
| Example 1 | 26 | 51.74 | 20 | 128 |
| Example 2 | 52 | 48.88 | 14 | 134 |
| Example 3 | 66 | 28.38 | 10 | 118 |
| Example 4 | 29 | 21.17 | 12 | 140 |
| Example 5 | 7 | 15.47 | 18 | 150 |
| Example 6 | 10 | 14.00 | 3 | 123 |
| Example 7 | 5 | 13.20 | 2 | 134 |
| Comparative Example 1 | 31 | 2.75 | 5 | 131 |

TABLE 2-continued

| | | | | |
|---|---|---|---|---|
| Comparative Example 2 | 2 | 5.88 | 1 | 137 |
| Comparative Example 3 | — | — | — | — |

As seen from Table 2, all of the crosslinked copolymers according to the present invention were water absorbent resins capable of absorbing a greater amount of water that can be absorbed by a plant. On the other hand, due to a notably small amount of pure water absorption (Comparative Example 1) or a notably low ratio of water that can be absorbed by a plant (Comparative Example 2), the crosslinked copolymers of these Comparative Examples absorbed only a smaller amount of water that can be absorbed by a plant. In addition, the crosslinked copolymer of Comparative Example 3 had a large standard deviation of the pure water absorption amount $W_1$ per 1 g of the crosslinked copolymer, and was inferior in the stability of its quality.

Moreover, the crosslinked copolymers according to the present invention were modified with an unsaturated monocarboxylic acid or a derivative thereof. Therefore, a crosslinking reaction between a carboxylic acid-derived carboxyl group and a hydroxy group of a vinyl alcohol unit, which easily occurs in a crosslinked copolymer modified with a polyfunctional unsaturated carboxylic acid or a derivative thereof, did not easily occur in the post-modification drying step, and the crosslinked copolymers according to the present invention thus had a superior stability of its quality.

INDUSTRIAL APPLICABILITY

The polyvinyl alcohol-based crosslinked copolymer of the present invention has a superior stability of its quality. Further, the polyvinyl alcohol-based crosslinked copolymer of the present invention has a high water release capacity in addition to a high water absorption capacity. Therefore, the crosslinked copolymer can be used as a water absorbent resin. Moreover, plants can absorb a greater amount of water available for their growth from the polyvinyl alcohol-based crosslinked copolymer of the present invention; therefore, the polyvinyl alcohol-based crosslinked copolymer of the present invention can be suitably used as, for example, a water-retaining material for agriculture.

The invention claimed is:

1. A polyvinyl alcohol-based crosslinked copolymer, comprising:

an unsaturated monocarboxylic acid-based structural unit, vinyl alcohol units, and acetal crosslinking structures formed with a polyfunctional aldehyde having 2-20 carbon atoms, wherein an amount of carboxylate-forming structural units in the crosslinked copolymer is in a range of from 1.5 to 15 mol. %, based on total structural units in the crosslinked copolymer, an amount of vinyl alcohol units in the polyvinyl alcohol-based crosslinked copolymer is in a range of from 20 to 98.5 mol. %, based on the total structural units in the crosslinked copolymer, an amount of acetalized vinyl alcohol units of the crosslinked copolymer is from 0.01% to 50% by mole of the total of vinyl alcohol units, and a solubility of the crosslinked copolymer in water is 5% or more and 90% or less.

2. The copolymer of claim 1, comprising a potassium ion as a counter cation of the carboxylate.

3. The copolymer of claim 1, wherein an amount of water that can be absorbed by a plant per 1 g of the polyvinyl alcohol-based crosslinked copolymer is in a range of from 10 to 100 g.

4. The copolymer of claim 1, wherein the polyfunctional aldehyde is at least one selected from the group consisting of glyoxal, malonaldehyde, succinaldehyde, glutaraldehyde, adipaldehyde, malealdehyde, fumaraldehyde, tartaraldehyde, citraldehyde, terephthalaldehyde, isophthalaldehyde, phthalaldehyde, 1,9-nonanedial, and ethylenediamine tetraacetaldehyde.

5. The copolymer of claim 1, wherein the unsaturated monocarboxylic acid-based structural unit is derived from acrylic acid or a derivative thereof, or methacrylic acid or a derivative thereof.

6. A method of producing a polyvinyl alcohol-based crosslinked copolymer, the method comprising:

reacting a polyvinyl alcohol-based copolymer containing an unsaturated monocarboxylic acid-based structural unit with a polyfunctional aldehyde having 2-20 carbon atoms, wherein an amount of carboxylate-forming structural units in the crosslinked copolymer is in a range of from 1.5 to 15 mol. %, based on total structural units in the crosslinked copolymer, an amount of vinyl alcohol units in the polyvinyl alcohol-based crosslinked copolymer is in a range of from 20 to 98.5 mol. %, based on the total structural units in the crosslinked copolymer, an amount of acetalized vinyl alcohol units of the crosslinked copolymer is from 0.01% to 50% by mole of the total of vinyl alcohol units, and a solubility of the crosslinked copolymer in water is 5% or more and 90% or less.

7. The method of claim 6, further comprising, in the presence of a solvent capable of swelling the polyvinyl alcohol-based copolymer:

reacting particles of the polyvinyl alcohol-based copolymer swollen with the solvent with the crosslinking agent.

8. A water-retaining material, comprising:

the copolymer of claim 1.

9. An agricultural water retaining material, comprising the water-retaining material of claim 8.

* * * * *